United States Patent
Send et al.

[19]

[11] Patent Number: 6,149,958
[45] Date of Patent: Nov. 21, 2000

[54] METHOD FOR PRODUCING PACKAGES CONTAINING VISCOUS FOODSTUFFS

[75] Inventors: Dietmar Send, Durach; Fritz Kortschack, Berlin, both of Germany

[73] Assignee: Dixie-Union GmbH & Co. KG, Kempten, Germany

[21] Appl. No.: 09/084,009

[22] Filed: May 26, 1998

[30] Foreign Application Priority Data

May 24, 1997 [EP] European Pat. Off. ............. 97108419

[51] Int. Cl.[7] ............................. A22C 11/00; A23B 4/00
[52] U.S. Cl. ......................... 426/413; 426/414; 426/512
[58] Field of Search ................................. 426/392, 410, 426/413, 414, 514, 513, 512, 128–129

[56] References Cited

U.S. PATENT DOCUMENTS

| 2,166,568 | 7/1939 | Kuhlke | 107/54 |
| 2,796,033 | 6/1957 | Feinstein | 107/54 |
| 3,216,832 | 11/1965 | King | 99/175 |
| 3,336,425 | 8/1967 | Valyi | 264/97 |
| 3,857,330 | 12/1974 | Ruckstaetter | 99/354 |
| 4,285,980 | 8/1981 | Lewis | 426/249 |
| 4,740,379 | 4/1988 | Noguchi et al. | 426/512 |
| 5,470,596 | 11/1995 | James | 426/512 |

FOREIGN PATENT DOCUMENTS 19518168 11/1996 Germany.

*Primary Examiner*—Keith D. Hendricks
*Assistant Examiner*—Drew Becker
*Attorney, Agent, or Firm*—Jacobson, Price, Holman & Stern, PLLC

[57] ABSTRACT

There is proposed a method and an apparatus for producing packages containing foodstuffs, in which a shape (10) made in a lower foil is at least partly covered or closed during the food filling process by a ram (2) which covers the shape (10).

5 Claims, 2 Drawing Sheets

METHOD FOR PRODUCING PACKAGES CONTAINING VISCOUS FOODSTUFFS

BACKGROUND OF THE INVENTION

The invention relates to a method and an apparatus for producing packages containing foodstuffs, in particular containing viscous foodstuffs such as raw sausage meats, sausages or dough, in which the food is introduced into a shaped lower foil which is at least partly covered by a ram.

German Patent Application 195 181 68.9 discloses such an apparatus and method. This application proposes a filling station which is arranged in the manner of a chamber and has an upper part and a lower part. Sausage meat is filled into mould-like shapes in a lower foil and pressed into the shape by means of a ram. Sealing by an upper foil then takes place.

The packages described are popular since they allow the foodstuff which is to be packaged, for example small sausages, to be made ready for sale without additional sausage skins, casings, artificial casings, etc. The shaped depression in the lower foil of these packages corresponds to the final shape of the finished products, for example a plurality of small sausages lying side by side but not touching. This filled lower foil is covered with an upper foil after filling and evacuated, and the foils are then sealed together such that each raw product is tightly enclosed. The pack may subsequently be heated to achieve preservation.

The advantage of such a method consists in the fact that, after having been enveloped by the two foils, the individual finished products are no longer touched by hand and contamination after the heating process is precluded. Very good storage quality is achieved, with the otherwise customary casing being dispensed with and in addition hygienic and simple portioning also being possible since the individually sealed sausages can be opened as required, without having to open a "large pack".

It is known from the above-mentioned publication to cover or close off the shaped foil using the ram. The food which has already been filled into the shape is pressed fully into the shape by the ram, with the result that any air bubbles or voids which exist are entirely filled up and complete filling of the shape is achieved. Air bubbles or voids which happen to remain are disadvantageous since jelly or fat can penetrate into these voids after heating and may then be visible at the surface of the package, thus spoiling the appearance of the package. It is also possible for such voids to arise within the packaged foodstuffs, with the result that the consistency of the food in this region is adversely altered.

BRIEF SUMMARY OF THE INVENTION

The present invention has the object of further developing the method and the apparatus described above such that the filling process or the packaging process is rationalized or accelerated.

This object is achieved by a method as proposed above in which the food is introduced into the shape once the shape has been covered by the ram.

This measure achieves considerable acceleration of the filling process. The function of the ram, namely to press down, and optionally also to provide complete sealing-off, is retained, use continuing to be made of the known advantages of the ram, in particular those from the above-mentioned publications. The food is introduced into the shape, for which purpose the ram for example has a filling opening. It is however also possible to choose another arrangement in order to achieve the effect of the invention. For example, a filling nozzle may be provided in addition to the ram, the nozzle being constructed separately from the ram and pressing the viscous food into the interior of the shape. For successful implementation of the invention it is also not necessary for the ram to seal the shape. The principal function of the ram continues to be that of pressing the introduced food into the shape such that the latter is entirely filled up. The pressure thereby exerted on the food in order to convey the latter into the shape also serves simultaneously as a force which acts against the ram and thus results in dense filling.

The proposal according to the invention markedly accelerates the filling process since at least one stage of the process is eliminated in comparison with the known method. Hitherto it was known first to fill the shape and then to use the ram. By filling the shape when it is sealed off or closed by the ram an advantage with respect to time is achieved.

A further advantage of the arrangement according to the invention is that it reliably avoids remnants of sausage meat or food coming into contact with the sealing surfaces during filling and lying against them, covering them and thereby hindering the sealing process.

In the preferred embodiment of the invention the ram closes the shape tightly. This avoids sausage meat pouring out of leaks and soiling the apparatus. The sealing-off also allows the interior of the shape to be evacuated, for example before, during or after the filling process.

There is also provision for the pressure in the volume of the shape sealed off by the ram to be controlled by a vent opening, and in particular to be evacuated via the vent opening. The vent opening may also serve to establish an overpressure in order to exert an additional mechanical pressure on the food flowing in, so as to achieve optimal filling of the shape. The food has the customary consistency, being substantially viscous, it being possible to set the viscosity within a large range.

As a rule, the food which is introduced is not liquid. Conversely, this opening may also be used for evacuation in order to avoid, for example, the formation of air bubbles, etc. This may be suitable in particular when further acceleration is to be achieved during final sealing. This partial evacuation may possibly remain in the food for a while owing to the viscosity and assists the evacuation in a sealing chamber. This advantage is observed in particular when the filling station is combined or integrated with a sealing chamber and evacuating chamber.

In a further advantageous embodiment of the invention, it is proposed that the shape be thermoformed into the lower foil by the ram or an element of the ram before filling the food into the shape. The thermoforming of the lower foil for the formation of the shapes is effected for example using a negative mould.

The invention is not limited only to the method described, but claims an apparatus for producing packages containing food in which the shape of the lower foil is at least partly covered by a ram. This apparatus preferably serves for carrying out the method described above. The apparatus of the prior art is improved such that the ram has a filling opening for the food. The advantages of the invention which are described above are applicable in the same way to the apparatus. The filling opening is made in the ram as a bore for example and at its end remote from the shape has a facility for connection to the filling machine.

For precise metering there is provision for the filling opening to be closable and openable by a controllable valve.

A controllable valve is constructed for example as a diaphragm valve which is pneumatically drivable. The diaphragm valve is fabricated for example from silicone and is thus suitable for use with foodstuffs.

For optimal sealing there is provision for the ram to have sealing surfaces which cooperate with the corresponding surfaces of the shape. The sealing surfaces may be effected for example by appropriate burring of the corner regions which cooperate with the surfaces of the shape. Sharp edges which could otherwise lead to damage, such as cracks or cuts in the lower foil, are thus thereby also avoided.

It has been found to be of advantage if the ram can be heated, the surface of the ram which faces the food having a temperature of about 25° to 45° C., in particular of 35°. This is achieved for example by indirect heating, for example a heated die or ram mounting which heats a plurality of rams in a decentralized manner. The heating causes a film of fat to form between the ram and the food, which avoids adherence of the food to the ram during relative movement between ram and filled foodstuff.

In a further embodiment of the invention there is provision for the surface of the ram to be of cone- or trough-like design and/or to have a non-stick coating. As a rule, a sausage is cylindrically shaped and has a substantially round cross-section. The customer will of course also wish to use appropriately shaped sausages in the case of the proposed finished products, where the design of the surface of the ram has a direct effect on the upper part of the food introduced into the shape since this region is touched, pressed and thus also shaped by the ram. An appropriate cone- or trough-like design leads to the mutually adjoining surfaces of the food having a smooth transition. This may be of advantage both for the packaging of sausages and for other forms of packaging, such as for example dough packages etc.

In addition, adherence of the food to the ram, for example during a releasing movement of the ram in order to convey the filled package onwards, may be avoided by a non-stick coating of the surface of the ram, for example using Teflon or the like.

In the preferred embodiment of the invention the ram is provided with a vent opening controllable by a valve. The vent opening may serve to evacuate the interior of the shape or else admit a counterpressure to it.

DETAILED DESCRIPTION OF PREFERRED EMBODIMENT

Figure 1:
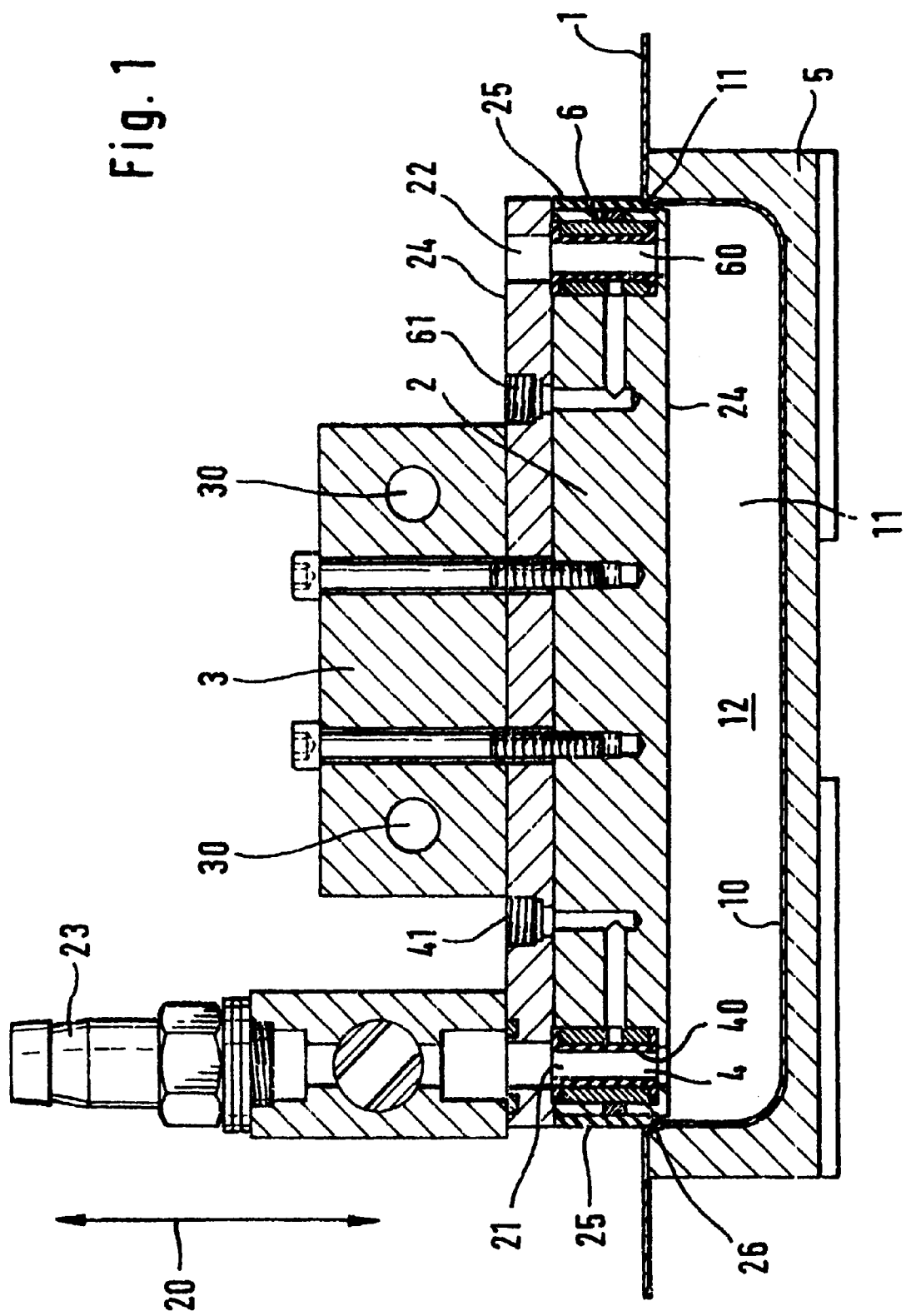
FIG. 1 shows, in a horizontal section, a side view of the apparatus according to the invention in a lowered position closing the shape.

FIG. 1 illustrates schematically a preferred embodiment of the apparatus according to the invention. A lower foil 1 has a downwardly protruding shape 10 which serves to receive any food of cigar- or trough-like design, for example raw sausages or dough. Such food is not usually liquid. The lower foil 1, and the shape 10, are supported by a lower part 5 adapted to conform to the shape 10. The lower part 5 may be, or may cooperate with, for example the lower part of a vacuum packaging chamber, may be integrated into the latter or serve only for mechanical support while the food is being introduced. The lower part 5 may nevertheless also serve for the thermoforming process for the formation of the shape 10. The apparatus according to the invention, and the method, also serves for lower foils which are prefabricated and are formed or put into the shape 10 before the latter is filled with food.

The ram 2 is moved down against the lower part 5, as shown in FIG. 1. Pneumatic or hydraulic working cylinders or electric motors, for example, which allow and effect an up-and-down movement 20 of the ram 2, serve for this purpose.

In the lowered position shown in FIG. 1, the inner space 12 of the shape 10 is completely sealed off by the ram 2. In this case the ram has, on its lateral periphery, running vertically in FIG. 1, a sealing surface 25 which consists for example of a rubber covering or other food-grade material (silicone) and cooperates with the surface 11 of the shape in such a way that sealing is achieved. It is of course also possible to construct the sealing surface 25 substantially horizontally to achieve the same effect.

Figure 2:
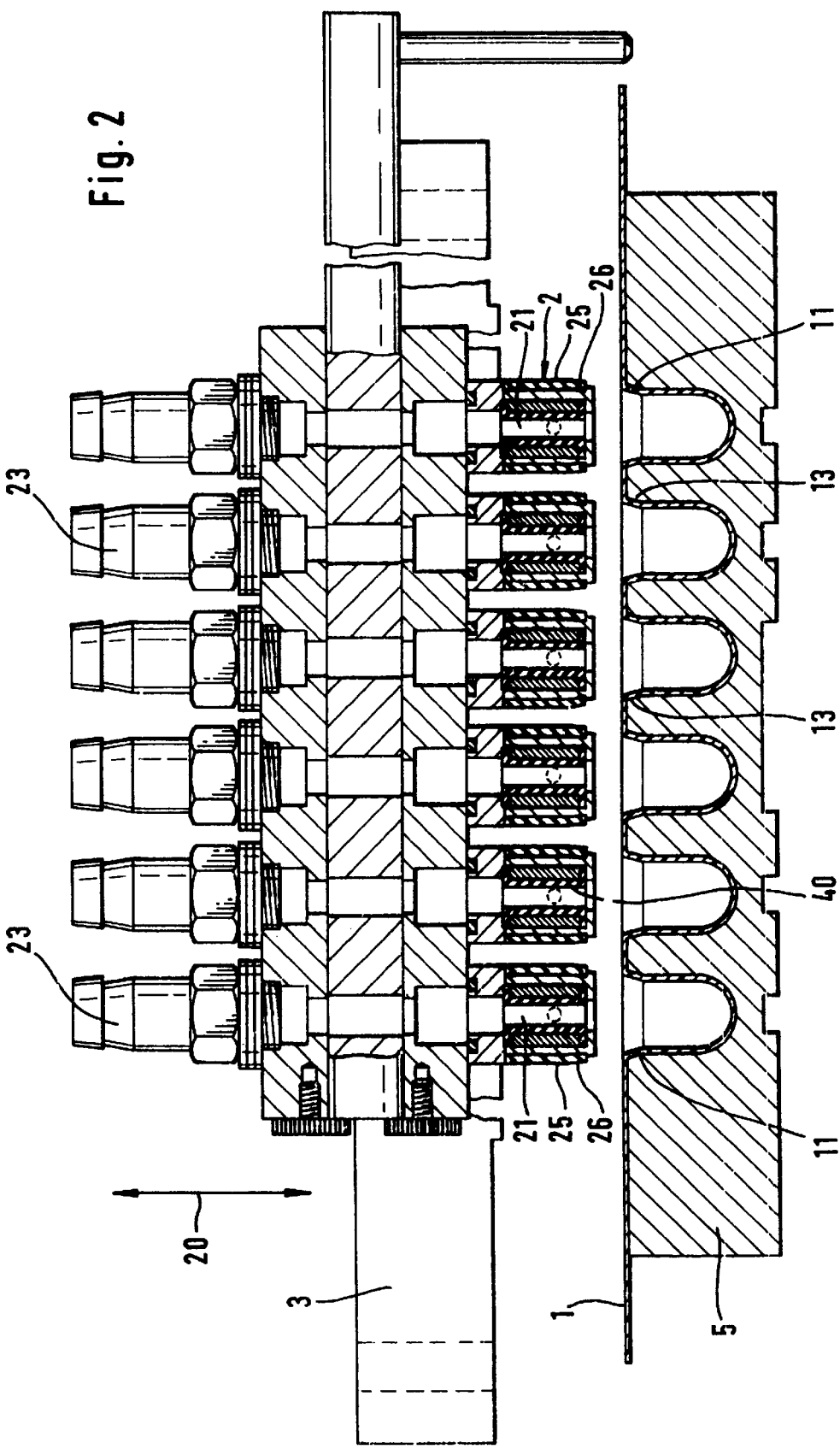
FIG. 2 shows, in a horizontal section, a front view of the apparatus according to the invention in a raised position.

FIG. 2 indicates by way of example that the sealing surface 25 has in its lower region a slight angled-off portion 26 into the interior of the shape. This angled-off portion 26 effects a cone-like contact of the sealing surfaces 25 against the surfaces 11 of the shape.

In the same way, the shape 10 also has in cross-section (see FIG. 2) a cone-like widening 13 arranged at the upper end of the surfaces 11 of the shape. This design facilitates filling of the food and also enables a secure seating of the ram 2 on the shape 10.

After the shape 10 has been filled with the food, the shape is evacuated, closed by the upper foil and then, for example, boiled or treated with superheated steam to achieve preservation. It is of course possible to introduce additional agents during the introduction of the food, for example liquid smoke to give the sausages a smoky flavour.

The food is introduced into the shape 10 through the filling opening 21 through the ram 2. The filling opening 21 is constructed for example as a bore arranged substantially at right angles to the surface 24 of the ram. It penetrates the ram 2 completely and is covered at the top by a connection piece 23 which is connected to a filling machine for example by a flexible tube or the like. The filling machine conveys the food through the connection piece 23 and the filling opening 21 into the shape 10. In the ram 2 there is provided a valve 4 which serves to interrupt the food filling process. This is advisable for example when a change of shape is to be carried out, that is to say when the completely filled shape 10 is exchanged for a shape which is still empty.

The ram 2 serves, for example in cooperation with the lower part 5, for completely filling the shape 10 with the food flowing in, without damaging the lower foil 1 in doing so. It should be noted that the food may be conveyed at a considerable pressure in order to introduce the viscous substances optimally into the package.

The valve 4 is driven by a control line 41 constructed here, for example, as a pneumatic line. The valve 4 is constructed in this case as a diaphragm valve 40 and reduces its inside diameter when compressed air is admitted to it, with the result that filling can be prevented. By appropriate dimensioning the diaphragm valve 40 is completely closed. The diaphragm valve 40 consists in this case of food-grade material, for example silicone.

The ram 2 is of a substantially elongated construction, appropriate for example for the filling or shaping of sausages. At its left-hand end (FIG. 1) there is arranged the valve 4 in the filling opening 21, as described above. At its right-hand end there is provided a vent opening 22 which is likewise controllable by a valve 6, likewise realized in this case by a diaphragm valve 60. The vent opening serves for the escape of the air present in the inner space 12. By means of the vent opening 22 evacuation may be performed or a counterpressure may be introduced into the inner space 12 in order thereby to achieve optimal distribution of the food in the inner space 12 of the shape 10. The diaphragm valve 60 is in this case driven by a control line 61, for example a compressed-air line or the like.

The control lines 41/61 cooperate with the machine control system and at the right moment in time effect opening and closing of the respectively connected valves.

The ram 2 is held by a mounting 3. The mounting 3 in this case carries a plurality of rams 2 arranged side by side in parallel, as indicated by way of example in FIG. 2. In the mounting 3 there is provision, for example, for resistance heating 30 which indirectly heats the mounting 3 and also the rams 2 connected or fastened thereto. It has been found that if the surface 24 of the ram has a slightly elevated temperature (for example between 25° to 45°), adherence of food to the surface 24 of the ram is optimally avoided. At precisely 35° it has been found that a film of fat forms on the surface of the ram which reliably avoids adherence of sausage meat and the like to the surface 24 of the ram. The heating may however also be integrated in the ram 2 in the same way and constructed in a different way.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method for producing packages containing viscous food, said method comprising the steps of:

providing a mold including several cavities arranged adjacent to each other, lining the mold with a lower film layer, tightly sealing the mold with a device consisting of a number of rams corresponding to the number of cavities, filling the cavities with the viscous food via ducts in the rams, removing the rams, and sealing the mold, containing the inserted foodstuff, by an upper film.

2. The method according to claim 1, wherein the lower film is thermoformed before the filling of the food in the cavities.

3. The method according to claim 1, wherein the pressure in each of the cavities sealed off by the rams is controlled by a vent opening.

4. The method according to claim 1, wherein the lower film thermoformed by the rams prior to the food being filled in the cavities.

5. The method according to claim 1, wherein the lower film is thermoformed in the mold by an element on the rams prior to the food being filled in the cavities.

* * * * *